(12) United States Patent
Zwicky et al.

(10) Patent No.: US 8,364,529 B1
(45) Date of Patent: Jan. 29, 2013

(54) SEARCH ENGINE OPTIMIZATION PERFORMANCE VALUATION

(75) Inventors: Richard Kazimierz Zwicky, Colwood (CA); Rafael Parra Hernandez, Victoria (CA)

(73) Assignee: Gere Dev. Applications, LLC, Wilmington, DE (US)

( * ) Notice: Subject to any disclaimer, the term of this patent is extended or adjusted under 35 U.S.C. 154(b) by 660 days.

(21) Appl. No.: 12/555,224

(22) Filed: Sep. 8, 2009

Related U.S. Application Data (60) Provisional application No. 61/094,821, filed on Sep. 5, 2008.

(51) Int. Cl.
*G06Q 30/00* (2006.01)
*G06F 7/00* (2006.01)

(52) U.S. Cl. ............... 705/14.4; 705/14.43; 705/14.54; 705/14.73; 707/735; 707/944

(58) Field of Classification Search ............... 705/14.4, 705/14.43, 14.54, 14.73; 707/735, 944
See application file for complete search history.

(56) References Cited

U.S. PATENT DOCUMENTS

| | | | |
|---|---|---|---|
| 6,006,260 A | 12/1999 | Barrick, Jr. et al. | |
| 6,421,675 B1 | 7/2002 | Ryan et al. | |
| 6,877,007 B1 | 4/2005 | Hentzel et al. | |
| 7,206,780 B2 | 4/2007 | Slackman | |
| 7,716,219 B2 * | 5/2010 | Sarukkai et al. | 707/735 |
| 8,001,131 B2 * | 8/2011 | Reese | 707/750 |
| 2002/0082923 A1 | 6/2002 | Merriman et al. | |
| 2002/0169760 A1 | 11/2002 | Cheung et al. | |
| 2004/0267806 A1 | 12/2004 | Lester | |
| 2005/0137939 A1 | 6/2005 | Calabria et al. | |
| 2005/0222987 A1 | 10/2005 | Vadon | |
| 2006/0031206 A1 | 2/2006 | Deubel et al. | |
| 2006/0136294 A1 | 6/2006 | Linden et al. | |
| 2006/0161520 A1 | 7/2006 | Brewer et al. | |
| 2006/0161534 A1 | 7/2006 | Carson et al. | |
| 2006/0161537 A1 | 7/2006 | Amitay et al. | |
| 2006/0161541 A1 | 7/2006 | Cencini | |
| 2006/0161542 A1 | 7/2006 | Cucerzan et al. | |
| 2006/0161591 A1 | 7/2006 | Huang et al. | |
| 2006/0161843 A1 | 7/2006 | Ebrahimi et al. | |
| 2006/0167852 A1 | 7/2006 | Dissett et al. | |
| 2006/0167854 A1 | 7/2006 | Dissett et al. | |
| 2006/0167857 A1 | 7/2006 | Kraft et al. | |
| 2006/0167874 A1 | 7/2006 | Von Ahn Arellano et al. | |

(Continued)

OTHER PUBLICATIONS

Alex Cleanthous; Estimating the Value of Search Engine Optimization; downloaded from <http://www.marketingpilgrim.com/2006/10/estimating-value-of-search-engine.html> on Aug. 10, 2009.

(Continued)

*Primary Examiner* — Donald L. Champagne
(74) *Attorney, Agent, or Firm* — Woodcock Washburn LLP (57) ABSTRACT

A way to promote a web site is via search engine optimization (SEO). Traditionally, SEO practitioners have charged a fixed fee for performing SEO services. An analyzer can determine a first probability that a search query for a campaign term will result in a referral from a search engine, determine second probabilities that are associated with a plurality of particular positions in a search engine results page, combine the search query volume information, the first probability, and the second probability for the position with a monetary value to generate an organic price, combine the organic prices for the plurality of positions to value the SEO services for the campaign term. The analyzer evaluates the effectiveness of SEO activities and can generate a volume-based value for SEO services. In addition, disclosed techniques can also be used to identify candidate terms for future SEO activities.

16 Claims, 5 Drawing Sheets

U.S. PATENT DOCUMENTS

| | | |
|---|---|---|
| 2006/0167896 A1 | 7/2006 | Kapur et al. |
| 2006/0168056 A1 | 7/2006 | Gandhi et al. |
| 2006/0200455 A1 | 9/2006 | Wilson |
| 2006/0265435 A1 | 11/2006 | Denissov |
| 2006/0265493 A1 | 11/2006 | Brindley et al. |
| 2007/0130131 A1 | 6/2007 | Porter et al. |

OTHER PUBLICATIONS

Filip Radlinski & Thorsten Joachims; "Query Chain: Learning to Rank from Implicit Feedback", Proceedings of the ACM Conference on Knowledge Discovery and Data Mining, Association for Computing Machinery, Aug. 21-24, 2005, 10 pages.

Joachims, "Optimizing Search Engines using Clickthrough Data, Proceedings of the ACM Conference on Knowledge Discovery and Data Mining", Association for Computing Machinery, 2002, 10 pages.

New Search Patent Applications: Aug. 1, 2006, Microsoft Answers?; [online] [retrieved on Aug. 21, 2006] Retrieved from the Internet: <URL: http://blog.searchenginewatch.com/060801232103>, 6 pages.

* cited by examiner

FIG. 1
PRIOR ART

Estimating Value of Placement
in an Organic SERP

SEARCH ENGINE OPTIMIZATION PERFORMANCE VALUATION

CROSS-REFERENCE TO RELATED APPLICATION

This application claims the benefit under 35 U.S.C. §119(e) of U.S. Provisional Application No. 61/094,821, filed Sep. 5, 2008, the entirety of which is hereby incorporated by reference.

BACKGROUND

1. Field of the Invention

The invention relates to online marketing, and in particular, to automation for monitoring and accounting in connection with search engine optimization (SEO) marketing activities.

2. Description of the Related Art

A search engine is a program that assists users to search for information on the Internet. When an Internet user enters a search query into an interface for a search engine, the search engine examines its index and provides a listing of matching documents. The usefulness of a search engine depends on the relevance of the result set it generates and shows to the web user. While there may be many documents that include a particular word or phrase, some documents may be more relevant, popular, or authoritative than others.

Figure 1:
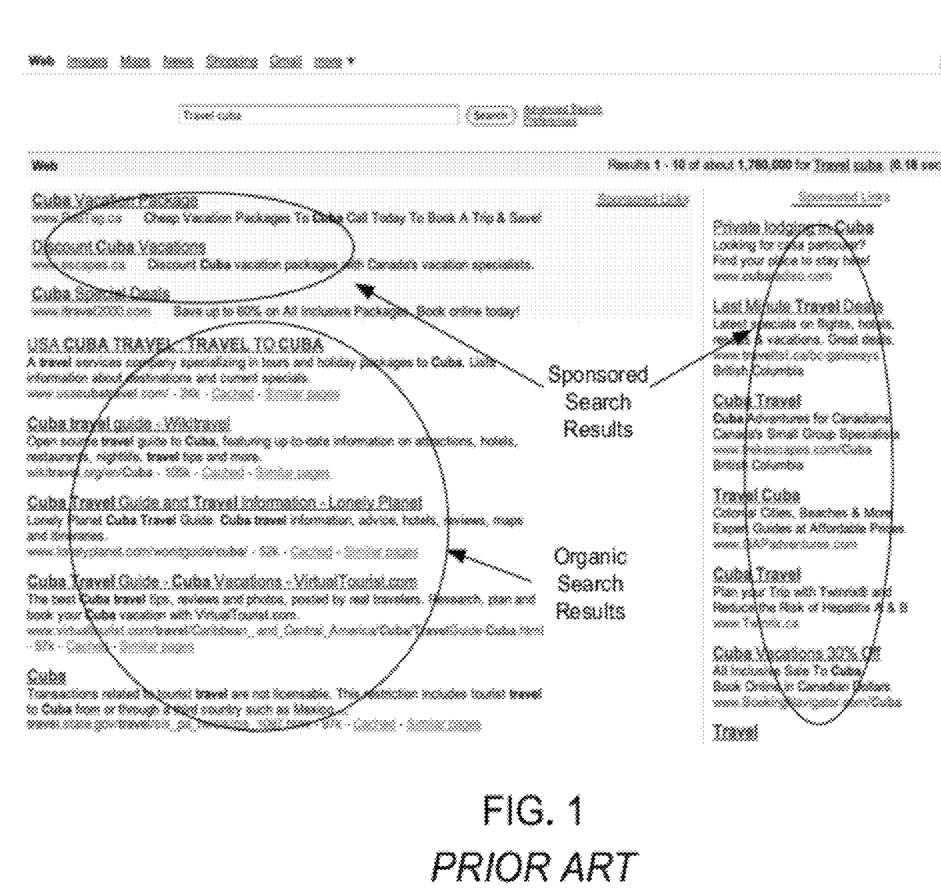
FIG. 1 illustrates an example of a search engine result page (SERP).

Some search engines provide search-related advertisements with regular search engine results in a search engine results page (SERP). A natural result set that should not be influenced by payment for listing is known as an organic search result and occupies a space within the total result set. A result set influenced by payment for listing is known as a sponsored search result. FIG. 1 illustrates a conventional search engine results page (SERP) which shows both organic and sponsored results.

One way to promote a web site is by purchasing advertising from advertising networks or publishers, such as on a pay per click (PPC) basis. Typically, advertising is selected based on an auction for the advertising space. While an advertising network may offer a defined price for advertising, such as an amount per click, it is more common for prices to be set through a bidding or auction arrangement.

Another way to direct traffic to a web site is via search engine optimization (SEO). A goal of SEO is to improve the visibility of a web site by making listings for the web site appear more frequently and more prominently in the free (organic) portion of a search engine results listing. Many strategies exist for performing SEO.

While SEO can be performed by operators of a web site itself, SEO services are typically performed by consultants or companies having specific SEO expertise. These SEO practitioners contract with a web site's operators to improve the ranking of links to the web site in a search engine's organic listing. For example, SEO practitioners can be compensated on a fixed fee basis, which can be supplemented with bonuses tied to specific results, such as (1) how high links to the web site are placed on the organic listing, (2) increases in Internet traffic (for example, page hits), or (3) increases in sales as a result of better (higher) Internet traffic, or to combinations of the same.

BRIEF DESCRIPTION OF THE DRAWINGS

These drawings and the associated description herein are provided to illustrate specific embodiments of the invention and are not intended to be limiting.

FIG. 4 is a data flow diagram generally illustrating interaction with web sites, with SEO service provides, and the like.

SUMMARY OF THE DISCLOSURE

A way to promote a web site is via search engine optimization (SEO). Traditionally, SEO practitioners have charged a fixed fee for performing SEO services. An analyzer can determine a first probability that a search query for a campaign term will result in a referral from a search engine, determine second probabilities that are associated with a plurality of particular positions in a search engine results page, combine the search query volume information, the first probability, and the second probability for the position with a monetary value to generate an organic price, combine the organic prices for the plurality of positions to value the SEO services for the campaign term. The analyzer evaluates the effectiveness of SEO activities and can generate a volume-based value for SEO services, which can be used as a reference for providing SEO services.

In addition, disclosed techniques can also be used to identify candidate terms for SEO for future services. An analyzer computes rates of referrals for each term in a set of terms. The set of terms comprises, for example, terms that are used in search engine queries to access the site. The analyzer identifies terms in the set that are underrepresented in terms of rates of referral relative to one or more other terms in the set, and these underrepresented terms are identified as being suitable for SEO.

DETAILED DESCRIPTION OF SPECIFIC EMBODIMENTS

Although particular embodiments are described herein, other embodiments of the invention, including embodiments that do not provide all of the benefits and features set forth therein, will be apparent to those of ordinary skill in the art. In addition, while illustrated in the context of web sites, the principles and advantages described herein are applicable to other types of sites and interactive systems that are accessible on a network.

Traditionally, SEO practitioners have charged a fixed fee for performing SEO services. While positions of listings (rankings) within an organic search result are not sold individually as PPC advertisements can be, these positions nonetheless have value. Techniques quantitatively monitor and value these rankings, and can generate a volume-based value for SEO services, which can be used as a reference for providing SEO services. These techniques can be implemented by software executed by computer hardware. All of the methods and processes described may be embodied in, and fully automated via, software code modules executed by computer hardware, such as one or more general purpose computers. The code modules may be stored on any type of physical computer-readable medium or computer storage device. Some or all of the methods may alternatively be embodied in specialized computer hardware. The results of the disclosed methods (e.g., generated data) may be stored persistently on any type of physical computer data storage media or system.

Instructions for the software can be stored in a tangible, computer-readable medium. Applicable computer systems include file servers, web servers, database software, network monitoring equipment, and the like.

One embodiment is a technique that automatically determines valuation for search engine optimization (SEO) services. Typically, particular phrases or keywords are selected as campaign terms for SEO by the web site operator. A SEO practitioner is then hired to perform SEO for the campaign terms. These campaign terms relate to query phrases used by Internet users when searching for information via a search engine tool. When, due to SEO activities, the campaign terms are identified as having been used by Internet users as search queries in associated search engine referrals, SEO activities can be valued.

To determine a valuation for SEO services, the illustrated embodiment of the invention uses "in-house," which can be proprietary data related to SEO, and third-party data related to pay per click (PPC) advertising. In one embodiment, the in-house or proprietary data comprises at least previously collected search engine referral data and pricing data for the same or related terms, and can be collected algorithmically or manually. One embodiment of the invention permits SEO practitioners to establish an intrinsic value for campaign terms, which can be used as a reference for SEO optimization services. For example, averages of these values for SEO services can be provided as values for similar terms; these values can vary according to performance metrics including: particular positions of links in listing, volumes of searches for campaign terms, and long tail phrases for campaign terms. To determine value for campaign terms, one embodiment of the invention uses third-party auction networks prices, for example, PPC pricing; however, these third-party prices are related to sponsored listings.

Valuation of Campaign Terms in Organic Searches

Figure 2:
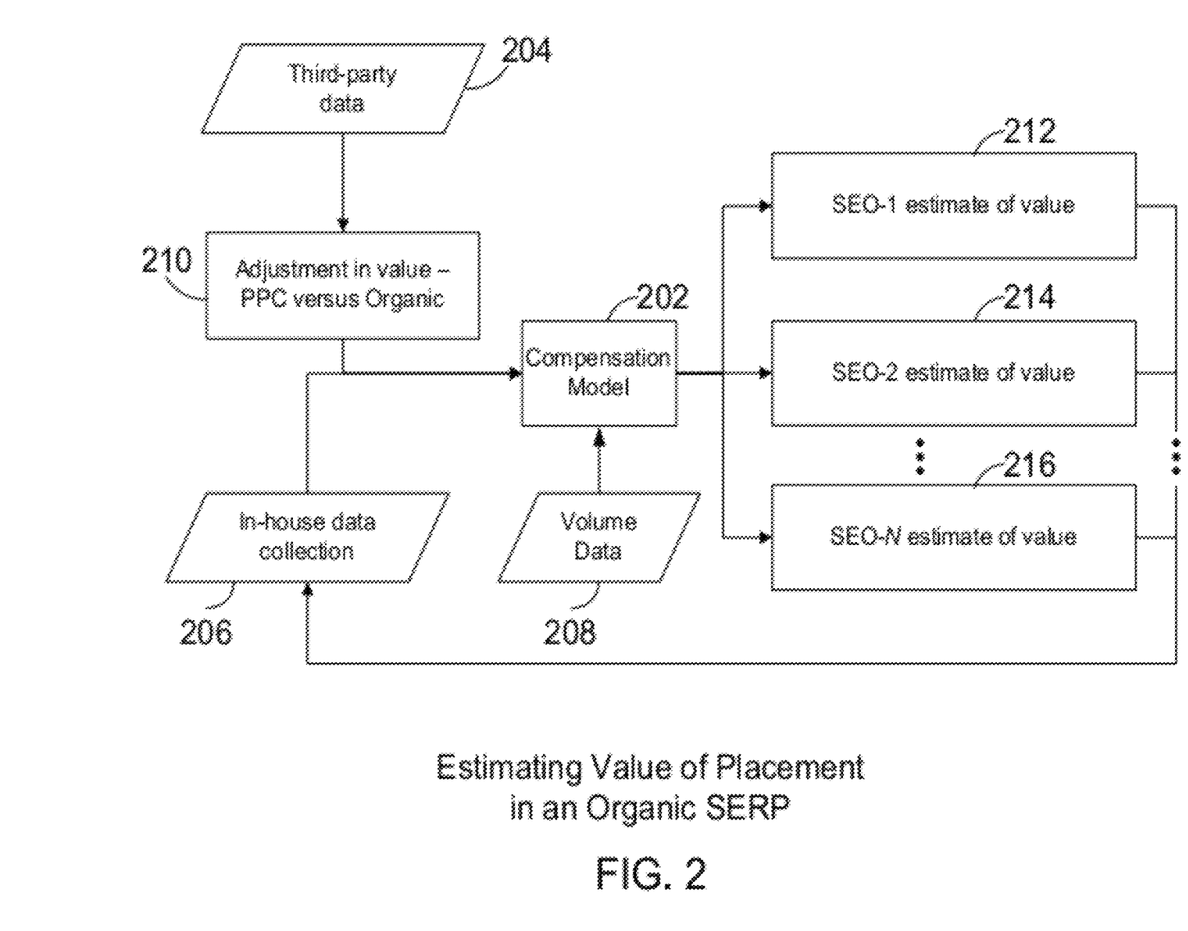
FIG. 2 illustrates inputs and outputs for an estimation model for valuing organic referrals.

FIG. 2 illustrates inputs and outputs for a compensation model 202 for valuing organic referrals. The compensation model 202 can use third-party data 204, such as price information for PPC advertisements, in-house data 206, and volume data 208.

The third-party data 204 can include, for example, PPC price data and PPC volume data. The third-party data 204 can further be adjusted 210 to account for the difference in usage of selection of sponsored links versus organic links within a SERP. For example, research indicates that informational searches are more common for organic listings than in sponsored listings. Many web site operators are interested only in specific transactional operations, such as sales, and thus, these operators will typically not value queries from organic search results equally as sponsored listings. Thus, sponsored listing prices should be adjusted to reflect these differences in value, such as: (1) differences in the fractions of transactional operations; (2) differences in the value of transactional operations; (3) the position of the listing in the organic space; and (4) the human perception that organic referrals are not as valuable as purchased (for example, PPC) referrals.

The in-house data 206 can include, for example, information regarding historical SEO service pricing for campaign terms, ranking performance, historical search activity volume, demographic data to identify potentially similar or like user profiles, global search activity volumes and behaviors, and referral volume behavior and patterns from non-search activity, such as hyperlink referrals wherein the hyperlink has anchor text (for example, <a href=http://no-site.com/>anchor text</a>) that is relevant to a particular term, and thus the activity from that link can be valued against outcomes from referrals. An outcome can be any monetary or monetary equivalent value which may be assigned to an action (such as the value of a conversion) which occurred as a result of a visitor who arrived via that referral. The volume data 208 can include, for example, information related to the volume of searches for particular terms, the rates of selection of links in particular positions, and the like.

One embodiment of the compensation model 202 will be described in greater detail later in connection with Equation 1. The compensation model 202 can generate a reference for a price for SEO services for a particular campaign term. For example, the value for SEO that results in the topmost ranking organic search result (SEO-1) 212 can be estimated by the compensation model 202. Similarly, other rankings such as the second highest ranking organic search result (SEO-2) 214 and an arbitrary N-th ranking SEO-N 216 can be computed. In an alternative embodiment, rather than represent organic search result ranking, blocks SEO-x in FIG. 2 can represent different SEO practitioners, and the compensation model 202 can be used to track the SEO performance of the various SEO practitioners. In an alternative embodiment, the compensation model 202 ranks these different SEO practitioners based on the relative performance of their SEO efforts, and generates a weighting for the different SEO practitioners.

Thus, SEO-x can represent at least one of: (1) an organic search result rank; (2) a particular SEO practitioner; or (3) a weight an SEO practitioner has among all SEO practitioners (rank). Any or a combination of these three can be used as inputs for the generation of an intrinsic value for campaign terms.

An organic price for placing a campaign term in a particular position (ranking) can depend on multiple factors, such as, but not limited to: (1) the number of search queries for the campaign term performed on a given network; (2) the probability that the volume (number of search queries) will result into actual referrals; and (3) the probability that such referrals take place from the desired position (ranking). When data is available, such as after SEO has been performed and data has been collected, the foregoing probabilities can be replaced with fractions based on actual data. These factors can be used to calculate the number of potential events. These events can include, but are not limited to referrals, clicks, visits, conversions, in which an SEO campaign term is used by the user in the search query, and wherein the campaign term present within the specified position or ranges of positions on the search engine results page (SERP).

The calculated number of events can be multiplied by a price per event. A price for similar events can be obtained from in house price data, which typically includes previously-collected search engine referral data and prices, whether collected algorithmically or via manual input for organic placement and/or from third-party data for placement on the paid-space.

More than one in-house source and third-party source of price data can be used as inputs. The in-house or proprietary data can change over time and can also vary seasonally, and thus, data covering vary sets of time can be selected. In one embodiment, the data is seasonally adjusted. For example, multiple sources of PPC data can be compiled from various search engines. In one example, price data from each source can be weighted according to pre-defined rules. For example, a volume-weighted price-average can be computed from multiple sources of PPC data, and the weighted average can be used to generate values for campaign terms. Pre-defined rules can also include weights that represent a perceived performance/usefulness of the various search engines from which PPC data is obtained. As is well known, some search engines produce more 'meaningful' or useful results than others.

While the perception of meaningfulness is qualitative, a weight can be assigned to each search engine to adjust the PPC data of the search engines to account for the differences in usefulness. Pre-defined rules can also include weights representing the fact that organic referrals tend to be more information seeking than referrals from paid listing. SEO values can be updated as data is collected based on actual usage, and the collected data can be kept in the in-house data collection 206

Equation 1 expresses an example of a mathematical model for estimating the value of placement of a link in a particular position Y in the organic space of a search engine results page. In the illustrated embodiment, the mathematical model uses both in-house and third-party price data as inputs. In an alternative embodiment, either in-house or third-party cost data suffices to estimate organic prices.

$$OP(x,y) = (S_x)(P_S)(P_{Ry})(\Sigma(W)(IP) + \Sigma(M)(TP)) \quad \text{(Eq. 1)}$$

In Equation 1, $OP(x,y)$ represents the organic price for placement of campaign term x in position y (position y is a particular position within a search engine results page; $S_x$ represents the search query volume for campaign term x; $P_S$ represents the fraction (when known, probability otherwise) of the search query phrase volume that converts into referrals; $P_{Ry}$ represents the fraction (when known, probability otherwise) of referrals listed in position y; IP represents one or more in-house sources of price data, W represents one or more weights denoting the importance (for example, rank) of each one of the multitude of in-house sources of price data; $\Sigma(W)(IP)$ represents the sum of the one or more in-house sources of price data each source properly weighted; TP represents one or more third-party sources of price data, M represents one or more weights denoting the importance (for example, rank) of each of the third-party sources of price data; $\Sigma(M)(TP)$ represents the sum of the one or more third-party sources of price data with each source properly weighted. In the illustrated embodiment, the formula expressed in Equation 1 is applied to a particular search engine to determine an organic price for placement on that search engine. In an alternative embodiment, such as, for example, for use with a relatively new search engine with little to no prior history, a combined, such as an average, organic price across multiple search engines can be generated. The data considered in Equation 1 can also be restricted to geographical regions, to specified time periods, and the like. In one embodiment, the weighted values $\Sigma(W)(IP)$ and $\Sigma(M)(TP)$ also vary by position y. The results over various campaign terms x and positions y can be summed.

Compensation models 202 can be combined with thresholds and/or limits to activate/de-activate the compensation model 202. For example, the compensation model 202 can be supplemented with a condition of not charging for events until the total number of events has reached a minimum threshold. In another example, the compensation calculated by the compensation model 202 can reach a cap when the compensation has reached an upper limit.

In an alternative embodiment, pricing for events other than campaign terms are modeled, such as pricing for external hyperlinks (for pages other than SERP) and conversions that are the result of visit due to SEO efforts. When these additional events are the result of SEO efforts, the events should be assigned values so that SEO efforts are properly compensated. In one example, a SEO practitioner and a site can specify that particular pages are included in a SEO campaign, or that all pages within the site may be included. In addition, off-site pages (external hyperlinks) can also be similarly identified. Typically, the arrangement between the SEO and the site is handled manually. Referring hyperlinks to the web site for which SEO is being performed are commonly recruited for at least two purposes: to expose the web site to additional visitors via the hyperlinks; and to increase a web site's importance (search engine algorithms can use the prevalence of links to documents/web sites to value the importance of a document or a web site). By procuring good quality links, a SEO practitioner attracts both new customers and also increases the exposure of the web site within the search engine result pages. Some link referrals and some search engine referrals will result in conversions; and if these referrals are the result of SEO efforts their corresponding conversions should be assigned values so SEO activities are compensated.

A variety of techniques can be used for assessing organic internet advertising performance. For example, the processes described in commonly-owned U.S. patent application Ser. No. 12/143,387, filed Jun. 20, 2008, titled "INTERNET MARKETING VERIFICATION TOOL," the disclosure of which is hereby incorporated by reference herein can be used to collect http referrers (referring hyperlinks or refer data) used to access a SEO-optimized web site and to evaluate the collected refer data against the campaign parameters for assessment of the Internet advertising. See, for example, FIG. 4 and the accompanying description of U.S. patent application Ser. No. 12/143,387. Campaign parameters include geographical origins of refer data, language preference of web user/visitor, and landing pages for refer data.

Identification of New Campaign Terms (Keywords)

To drive even more volume to the pages of a web site, SEO can be performed on additional terms. For example, there can be more than one way to describe a topic, there can be more than one way to spell a word, and the like. Preferably, all relevant terms are optimized by SEO. However, oftentimes, there are terms that are unknown or otherwise not recognized when SEO is being performed. This can happen frequently with, for example, new lingo, alternative spellings, or current events. These new terms can be used as new campaign terms or keywords for SEO, further enhancing SEO efforts for the web site for which SEO is being performed.

In the context of online marketing, a web site operator would prefer to have its search result listings in a relatively high position of a SERP, such as, for example, the first position of the first page of a SERP. However, some search terms are more competitive than others and achieving a desired position for a competitive search term may not be practical for a particular web site. However, there may be other search terms from which a web site receives hits (or can potentially receive hits) that are not as competitive as the most competitive search terms, and SEO can be performed for these other search terms to achieve higher traffic for the web site.

Figure 3:
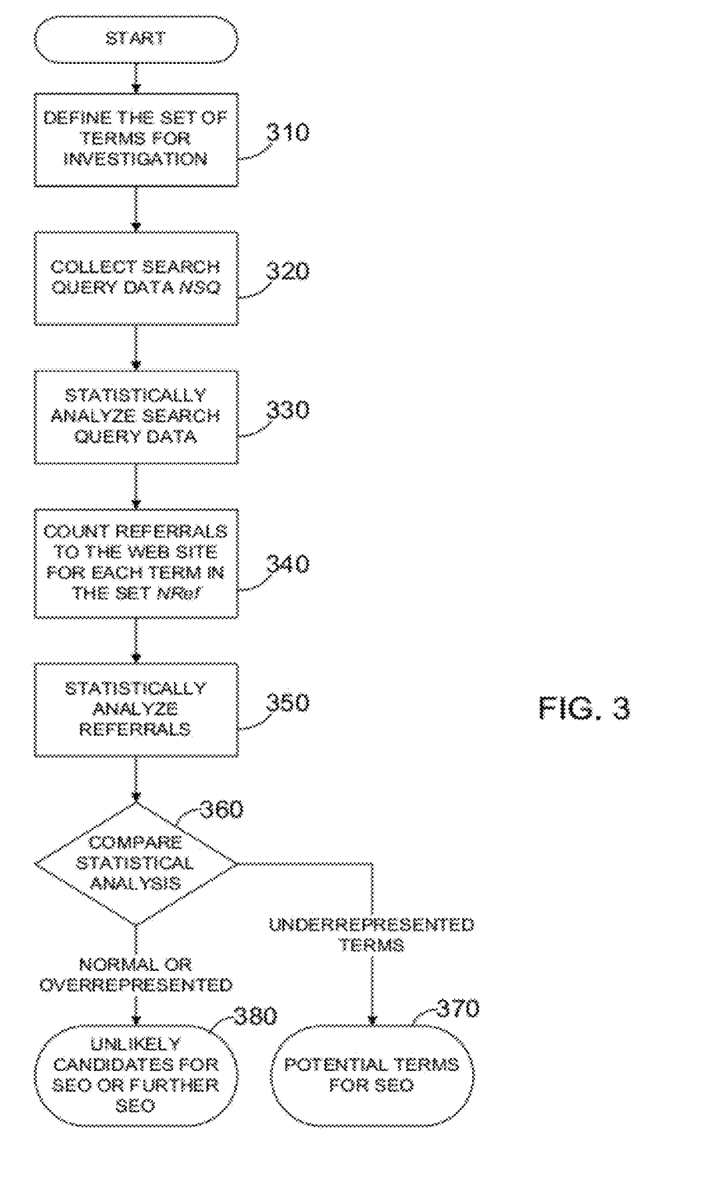
FIG. 3 is a flowchart generally illustrating a process for identifying new campaign terms (keywords).

FIG. 3 illustrates a process that can be used to test and/or identify new campaign terms (keywords). In this context, "new" relates to the identification of terms for SEO efforts other than existing campaign terms, which, after SEO can generate statistically meaningful additional traffic to the web site. The process can be used to identify search terms to be used for campaign terms, and can alternatively be used to determine whether it is worth the expense to perform SEO for proposed campaign terms.

The illustrated process can be modified in a variety of ways. For example, in another embodiment, various portions of the illustrated process can be combined, can be rearranged in an alternate sequence, can be removed, or the like. At the start of the process, it is assumed that data for analysis has already been collected.

The process begins at a state 310 by defining the set of terms for investigation by the process. The set of terms are those terms that are at least worthy of investigation for possible SEO for the particular web site, and thus, should be over inclusive. These terms can be words or phrases. These terms can be, for example, terms that were found to have been used by users as search queries to access web pages of the web site, terms derived from analysis of web pages of the web site for which SEO services are being considered, associated PPC terms, and any other term deemed worthy of investigation. The process then analyzes these terms to determine whether SEO of these terms would be beneficial as described below.

The process advances from the state 310 to a state 320 to collect search query data. For example, for each term in the set of terms, the process can determine the corresponding search query volume, that is, how many times users used the particular term as a search query term. The count can be limited to one or more selected search engines, to particular countries or other geographic limitations, to particular time or date ranges, and the like. In one embodiment, the count is determined by retrieving the query volume information from a variety of search engines and combining the retrieved information. In the tables that follow, this count corresponds to the variable NSQ.

An appropriate time or date range will vary depending upon the popularity of a web site. For example, a high-volume web site may generate enough traffic for analysis in a relatively short period of time. However, a relatively low-volume web site may need to have data collected over a relatively lengthy time period, such as over 10 days, to collect enough data to be analyzed meaningfully. The process advances from the state 320 to a state 330.

In the state 330, the process statistically analyzes the search query data for each term of the set. In a simple example, the process can compute the fraction of the total search query volume for each term in the set, that is, the volume of search queries for each particular term of the set divided by the total volume of search queries in the set. This statistical analysis establishes a point of reference for search queries. The process advances from the state 330 to a state 340.

In the state 340, the process counts the actual referrals to the web site for each term in the set. In the tables that follow, this count corresponds to the variable NRef. The prior constraints used in the state 320, such as geographical constraints, time or date range constraints, and the like, should again be applicable in the state 340. The process advances from the state 340 to a state 350.

In the state 350, the process analyzes the actual referrals. In one example, the process can compute the fraction of the total actual referral volume for each term in the set, that is, the volume of referrals for each particular term of the set divided by the total volume of referrals in the set. This statistical analysis establishes a point of reference for referrals. The process advances from the state 350 to a decision block 360.

In the decision block 360, the process compares the statistical analysis of each of the terms in the set. In one example, the process compares the fraction of the total actual referral volume for a particular keyword versus the fraction of the total search query volume (baseline reference) for said keyword. The comparison is used to determine whether the term is a good candidate for a campaign term SEO. For example, if the fraction of total actual referral volume is lower than a pre-defined amount of the fraction of the total search query volume (baseline) then said term is identified as underrepresented (for example, 30% versus 50%).

In another example, the process compares the ranking of the fraction of the total actual referral volume for a particular keyword (term) versus the ranking of the fraction of the total search query volume (baseline reference) for the particular keyword (term). For example, if the ranking of the fraction of the total actual referral volume is lower than a predefined amount of the ranking of the fraction of the total search query volume (baseline) then the keyword (term) is identified as underrepresented (for example, rank 2 versus rank 5).

In another example, the process compares the ranking of the fraction of the total actual referral volume for all keywords versus the ranking of the fraction of the total search query volume (baseline reference) for all keywords. For example if the set of fractions of the total actual referral volume for all keywords is statistically different from the set of fractions of the total search query volume for all keywords then a delta in fractions to the set of fractions of the total actual referral volume is estimated so that the new fractions are similar (or identical) to the fractions of the total search query volume. For example, for each term in the set, the process computes a value for term volume TV as the maximum of the count of referrals NRef or the count of the search query volume NSQ. The maximum of the two is used to cap a later computed value for term ratio TR, as there can be discrepancies when the number of referrals from sources outside of search engines is relatively large such that there will be more referrals than search queries (sometimes search query volumes are estimated from samples of the universe of search queries; if samples are not representative then these may have no correlation with a true count (no sampling) of the universe of search queries) or when there are problem with data collection, or the like. The process then computes a value for the term ratio TR as the count of referrals NRef divided by the term volume TV. The process compares the term ratio TR of each of the terms to a baseline reference to determine whether the term is a good candidate for a campaign term SEO. In one embodiment, the baseline reference is the best performing term in the set of terms, and terms below a predetermined percentage of the baseline reference value are identified for SEO.

The terms having a referral rate below a predefined amount of the reference baseline value are identified as underrepresented and potential terms 370 for SEO. The predefined amount can vary widely based on a variety of factors, such as on the overall value of SEO for the web site. For example, underrepresented can be determined to be about 10% or more below the reference baseline value, but other applicable values will be readily determined by one of ordinary skill in the art. The terms that already have a similar referral rate to the baseline or are already overrepresented are unlikely 380 to make good candidates for SEO.

In one embodiment, the process calculates a hypothetical amount of volume that could have been driven to the web site had selected terms in the set been optimized as campaign terms for SEO. For example, the process can calculate the difference in rate between an expected rate and the actual rate, and multiply that difference in rate with the number of search queries NSQ for those terms. In addition, conversion rates can be used to determine an amount of revenue that would have been generated. These tools permit a web site operator and/or SEO practitioner to determine whether it is worth the effort to perform SEO on selected terms.

Table 1 illustrates an example of computations using the process of FIG. 3. Sample keywords labeled "A" to "D" are used. In this example, keyword "D" has the largest term ratio TR of 0.75 and is used as a baseline reference. The "Expected Traffic" computes the expected number of referrals on the site of interest if these terms were to be included in SEO. The "Potential Benefit" column is the difference between the expected traffic and the actual number of referrals NRef, and the column indicates the additional volume that the web site can potentially receive per term if the terms are included in SEO efforts.

TABLE I

| Term | Search Query (NSQ) | Number Referrals (NRef) | Term Volume (TV) | Term Ratio (TR) | Expectation Volume | Potential Benefit |
|---|---|---|---|---|---|---|
| A | 100 | 40 | max(40,100) = 100 | 40/100 = 0.4 | 100 × 0.75 = 75 | max(0,75-40) = 35 |
| B | 15 | 10 | max(10,15) = 15 | 10/15 = 0.66 | 15 × 0.75 = 11.25 | max(0,11.25-10) = 1.25 |
| C | 30 | 20 | max(20,30) = 30 | 20/30 = 0.66 | 30 × 0.75 = 22.5 | max(0,22.5-20) = 2.5 |
| D | 40 | 30 | max(30,40) = 40 | 30/40 = 0.75 | 40 × 0.75 = 30 | max(0,30-30) = 0 |

Table II illustrates that the percentage distribution of the "Expected Volume" should be about the same (identical in the example) to that of the "Search Query" volume.

TABLE II

| Term | Search Query (NSQ) | Distribution Search Query | Expectation Volume (referrals) | Distribution ideal traffic |
|---|---|---|---|---|
| A | 100 | 54% = 100/185 | 75 | 54% = 75/138.75 |
| B | 15 | 8.1% = 15/185 | 11.25 | 8.1% = 11.25/138.75 |
| C | 30 | 16.2% = 30/185 | 22.5 | 16.2% = 22.5/138.75 |
| D | 40 | 21.6% = 40/185 | 30 | 21.6% = 30/138.75 |
| Total | 185 | N/A | 138.75 | N/A |

Figure 4:
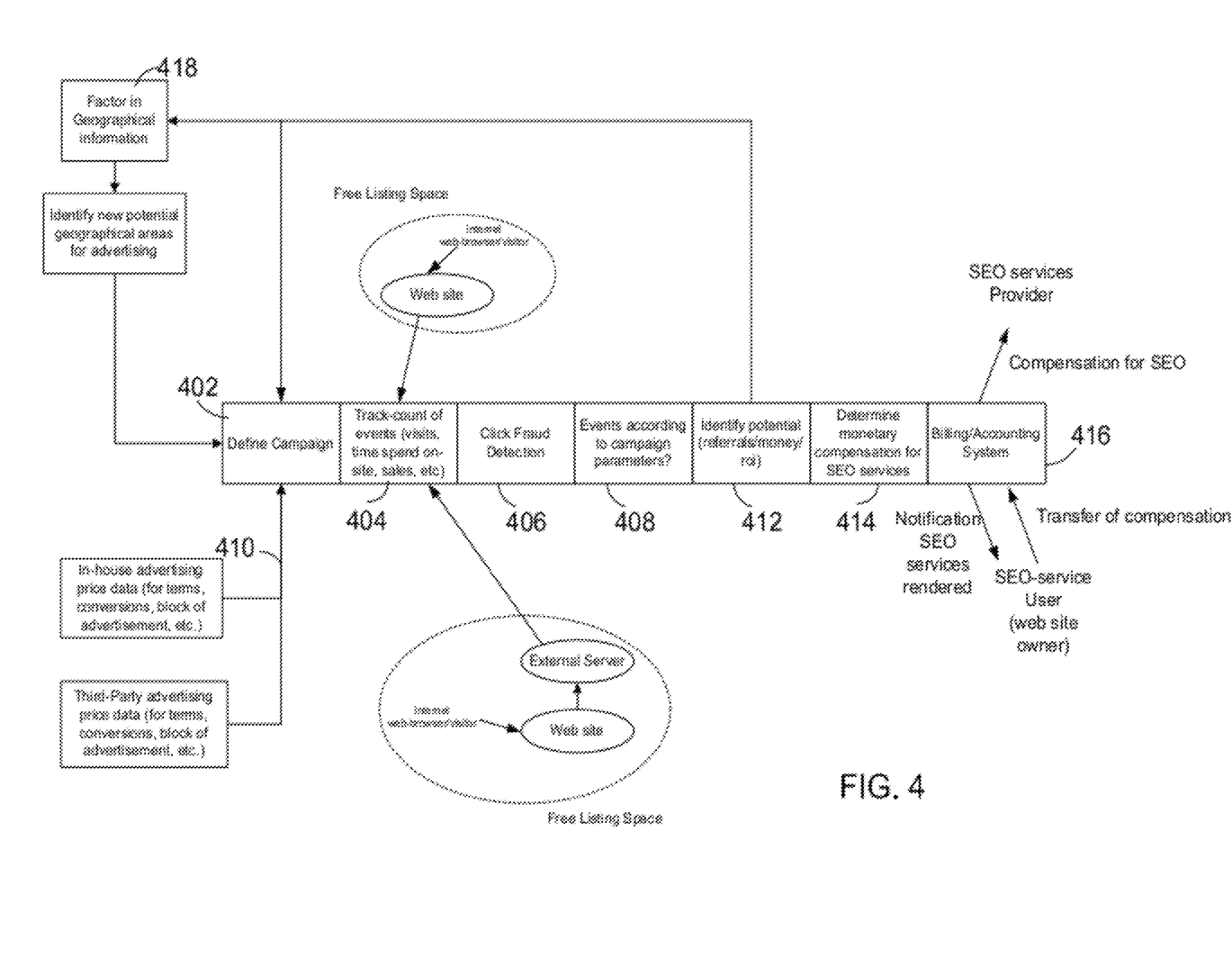

FIG. 4 is a data flow diagram generally illustrating interaction with web sites, with SEO service provides, and the like. Campaign events 402 are defined (referrals; hyperlinks; conversions; etc) to track. SEO results are determined 404 by, for example, counting/tracking pre-defined events (for example, visits, actions, sales). Fraudulent events are identified and filtered 406 (for example, high traffic but no sales). Events are verified 408 that they match pre-defined parameters (for example, sales from the United States). Values are assigned 410 to events. Sources of revenue are identified 412 (for example, potential referrals/money/return-on-investment). Monetary compensation is determined 414 for SEO services provided or to be provided. A billing/accounting mechanism 416 provides billing to web site operator based on the value of work delivered, and to the search marketer based on performance of work delivered. A feedback loop mechanism 418 modifies a campaign based on sources of revenue (potential). After terms with relatively good potential have been identified, these identified terms can be forwarded to SEO practitioners for optimization.

Figure 5:
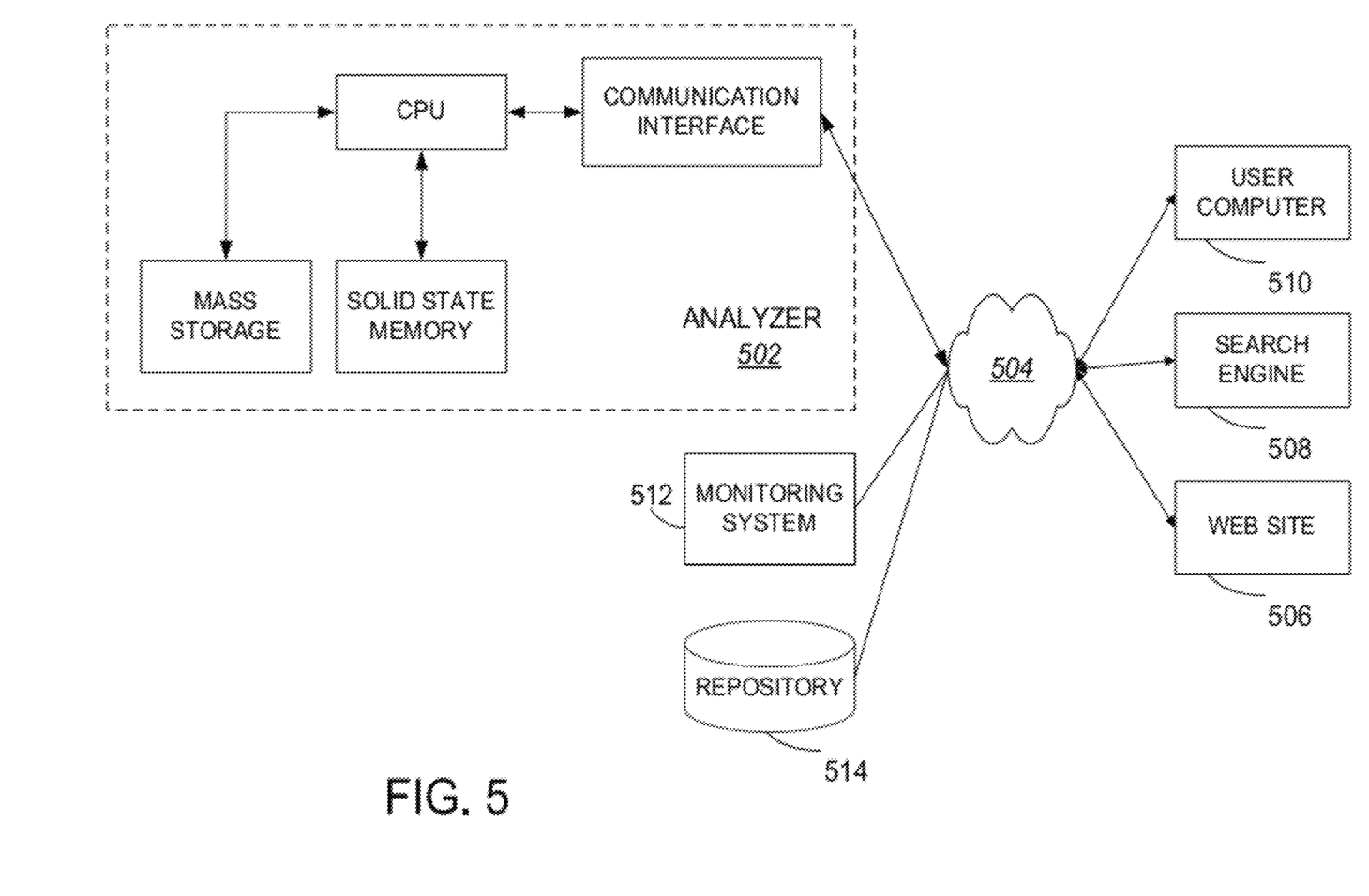
FIG. 5 illustrates an analyzer 502 can be used to implement an embodiment of the invention.

FIG. 5 illustrates an analyzer 502 can be used to implement an embodiment of the invention. For example, the analyzer 502 can be configured to implement the process described earlier in connection with FIG. 2 or the process described earlier in connection with FIG. 3. The various systems illustrated in FIG. 5 can be implemented by computer hardware that executes software instructions.

FIG. 5 illustrates an the analyzer 502, a network 504, a web site 506 for SEO, a search engine 508, a user computer 510, a monitoring system 512, and a data repository 514. The network 504 can correspond to local area networks and to wide area networks, such as the Internet. The web site 506 represents a web site that is being optimized by SEO practitioners or is considering using SEO. The search engine 508 provides search engine results pages (SERP) to the user computer 510. The monitoring system 512 and data repository 514 or data store can be used to collect http referrers (referring hyperlinks or refer data) used to access a SEO-optimized web site and to evaluate the collected refer data against the campaign parameters for assessment of the Internet advertising.

Various embodiments have been described above. Although described with reference to these specific embodiments, the descriptions are intended to be illustrative and are not intended to be limiting. Various modifications and applications may occur to those skilled in the art.

What is claimed is:

1. A method of valuing services for search engine optimization (SEO) of a campaign term, the method comprising:
   retrieving search query volume information for the campaign term;
   determining a first probability that a search query for the campaign term will result in a referral from a search engine;
   determining a plurality of second probabilities, wherein the second probabilities are each associated with one or more particular positions in a search engine results page;
   generating an organic price for each of the one of more particular positions based on the search query volume information, the first probability, a second probability for a particular position, and a monetary value for the particular position; and
   generating a value of the SEO services for the campaign term based on the organic prices for the one of more particular positions;
   wherein determining the first probability, determining the plurality of second probabilities, generating the organic price, and generating the value of the SEO services are performed, at least in part, by one or more computing devices.

2. The method of claim 1, wherein the monetary value is based on search engine optimization fees and pay per click fees.

3. The method of claim 1, wherein generating the organic price for each of the one or more particular positions comprises generating the organic price substantially according to the following:

$$OP(x,y) = (S_x)(P_S)(P_{Ry})(\Sigma(W)(IP) + \Sigma(WM)(TP))$$

wherein OP(x,y) represents an organic price of campaign term x in position y, wherein $S_x$ corresponds to a search query volume, wherein $P_S$ corresponds to the first probability, wherein $P_{Ry}$ corresponds to the second probability, wherein $\Sigma(W)(IP)$ corresponds to a value associated with an organic search, and wherein $\Sigma(WM)(TP)$ corresponds to a value associated with pay per click (PPC) advertising.

4. The method of claim 1, wherein the first probability and each of the plurality of second probabilities correspond to computed fractions based on actual data.

5. An apparatus for valuing services for search engine optimization (SEO) of a campaign term for a site, the apparatus comprising:
   a data store configured to store search query volume information for the campaign term; and an analyzer comprising one or more computing devices, said analyzer configured to:
- determine a first probability that a search query for the campaign term will result in a referral from a search engine;
- determine a plurality of second probabilities, wherein the second probabilities are each associated with one or more particular positions in a search engine results page;
- generate an organic price for each of the one or more particular positions based on the search query volume information, the first probability, a second probability for a particular position, and a monetary value for the particular position; and
- generate a value of the SEO services for the campaign term based on the organic prices for the one or more particular positions.

6. The apparatus of claim 5, wherein the monetary value is based on search engine optimization fees and pay per click fees.

7. The apparatus of claim 5, wherein the analyzer is configured to generate the organic price for each of the one of more particular positions substantially according to the following:

$$OP(x,y)=(S_x)(P_S)(P_{Ry})(\Sigma(W)(IP)+\Sigma(WM)(TP))$$

wherein $OP(x,y)$ represents an organic price of campaign term x in position y, wherein $S_x$ corresponds to a search query volume, wherein $P_S$ corresponds to the first probability, wherein $P_{Ry}$ corresponds to the second probability, wherein $\Sigma(W)(IP)$ corresponds to a value associated with an organic search, and wherein $\Sigma(WM)(TP)$ corresponds to a value associated with pay per click (PPC) advertising.

8. The apparatus of claim 5, wherein the first probability and each of the plurality of second probabilities correspond to computed fractions based on actual data.

9. A computer readable storage medium having instructions embodied thereon for valuing services for search engine optimization (SEO) of a campaign term, the instructions comprising:
- instructions to retrieve search query volume information for the campaign term;
- instructions to determine a first probability that a search query for the campaign term will result in a referral from a search engine;
- instructions to determine a plurality of second probabilities, wherein the second probabilities are each associated with one or more particular positions in a search engine results page;
- instructions to generate an organic price for each of the one of more particular positions based on the search query volume information, the first probability, a second probability for a particular position, and a monetary value for the particular position; and
- instructions to generate a value of the SEO services for the campaign term based on the organic prices for the one of more particular positions.

10. The computer readable medium of claim 9, wherein the monetary value is based on search engine optimization fees and pay per click fees.

11. The computer readable medium of claim 9, wherein the instructions to generate the organic price for each of the one of more particular positions comprise instructions to generate the organic price substantially according to the following:

$$OP(x,y)=(S_x)(P_S)(P_{Ry})(\Sigma(W)(IP)+\Sigma(WM)(TP))$$

wherein $OP(x,y)$ represents an organic price of campaign term x in position y, wherein $S_x$ corresponds to a search query volume, wherein $P_S$ corresponds to the first probability, wherein $P_{Ry}$ corresponds to the second probability, wherein $\Sigma(W)(IP)$ corresponds to a value associated with an organic search, and wherein $\Sigma(WM)(TP)$ corresponds to a value associated with pay per click (PPC) advertising.

12. The computer readable medium of claim 9, wherein the first probability and each of the plurality of second probabilities correspond to computed fractions based on actual data.

13. An apparatus for valuing services for search engine optimization (SEO) of a campaign term, the apparatus comprising:
- means for retrieving search query volume information for the campaign term;
- means for determining a first probability that a search query for the campaign term will result in a referral from a search engine;
- means for determining a plurality of second probabilities, wherein the second probabilities are each associated with one or more particular positions in a search engine results page;
- means for generating an organic price for each of the one of more particular positions based on the search query volume information, the first probability, a second probability for a particular position, and a monetary value for the particular position; and
- means for generating a value of the SEO services for the campaign term based on the organic prices for the one of more particular positions.

14. The apparatus of claim 13, wherein the monetary value is based on search engine optimization fees and pay per click fees.

15. The apparatus of claim 13, wherein the means for generating the organic price for each of the one or more particular positions in configured to generate the organic price substantially according to the following:

$$OP(x,y)=(S_x)(P_S)(P_{Ry})(\Sigma(W)(IP)+\Sigma(WM)(TP))$$

wherein $OP(x,y)$ represents an organic price of campaign term x in position y, wherein $S_x$ corresponds to a search query volume, wherein $P_S$ corresponds to the first probability, wherein $P_{Ry}$ corresponds to the second probability, wherein $\Sigma(W)(IP)$ corresponds to a value associated with an organic search, and wherein $\Sigma(WM)(TP)$ corresponds to a value associated with pay per click (PPC) advertising.

16. The apparatus of claim 13, wherein the first probability and each of the plurality of second probabilities correspond to computed fractions based on actual data.

* * * * *

UNITED STATES PATENT AND TRADEMARK OFFICE
CERTIFICATE OF CORRECTION

PATENT NO. : 8,364,529 B1
APPLICATION NO. : 12/555224
DATED : January 29, 2013
INVENTOR(S) : Zwicky et al.

Page 1 of 2

It is certified that error appears in the above-identified patent and that said Letters Patent is hereby corrected as shown below:

In the Specifications

In Column 5, Line 9, delete "206" and insert -- 206. --, therefor.

In Column 9, Line 57, delete "an the" and insert -- the --, therefor.

In the Claims

In Column 10, Line 30, in Claim 1, delete "one of" and insert -- one or --, therefor.

In Column 10, Line 36, in Claim 1, delete "one of" and insert -- one or --, therefor.

In Column 10, Line 47, in Claim 3, delete "one of" and insert -- one or --, therefor.

In Column 11, Line 10, in Claim 5, delete "one of" and insert -- one or --, therefor.

In Column 11, Line 22, in Claim 7, delete "one of" and insert -- one or --, therefor.

In Column 11, Lines 51-52, in Claim 9, delete "one of" and insert -- one or --, therefor.

In Column 11, Line 57, in Claim 9, delete "one of" and insert -- one or --, therefor.

In Column 12, Lines 2-3, in Claim 11, delete "one of" and insert -- one or --, therefor.

In Column 12, Line 30, in Claim 13, delete "one of" and insert -- one or --, therefor.

In Column 12, Line 36, in Claim 13, delete "one of" and insert -- one or --, therefor.

Signed and Sealed this
Eleventh Day of March, 2014

Michelle K. Lee
*Deputy Director of the United States Patent and Trademark Office*

CERTIFICATE OF CORRECTION (continued)
U.S. Pat. No. 8,364,529 B1

In Column 12, Line 42, in Claim 15, delete "one of" and insert -- one or --, therefor.

In Column 12, Line 43, in Claim 15, delete "in configured" and insert -- is configured --, therefor.